(12) United States Patent
Pollum, Jr. et al.

(10) Patent No.: US 12,291,633 B2
(45) Date of Patent: *May 6, 2025

(54) COATING COMPOSITIONS

(71) Applicant: PPG Industries Ohio, Inc., Cleveland, OH (US)

(72) Inventors: Marvin Michael Pollum, Jr., Pittsburgh, PA (US); Joseph Peter Kriley, Valencia, PA (US); Masayuki Nakajima, Wexford, PA (US); Ljiljana Maksimovic, Allison Park, PA (US); Brian Kirk Rearick, Allison Park, PA (US); Adam B. Powell, Wexford, PA (US); David Joseph Fortman, Pittsburgh, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 18/190,798

(22) Filed: Mar. 27, 2023

(65) Prior Publication Data

US 2023/0250274 A1     Aug. 10, 2023

Related U.S. Application Data

(63) Continuation of application No. 16/968,848, filed as application No. PCT/US2018/064695 on Dec. 10, 2018, now Pat. No. 11,732,125.

(60) Provisional application No. 62/628,540, filed on Feb. 9, 2018, provisional application No. 62/630,473, filed on Feb. 14, 2018.

(51) Int. Cl.

| | |
|---|---|
| C08G 59/24 | (2006.01) |
| B32B 27/38 | (2006.01) |
| C08G 59/22 | (2006.01) |
| C08G 59/40 | (2006.01) |
| C08G 59/68 | (2006.01) |
| C08K 3/013 | (2018.01) |
| C08L 25/10 | (2006.01) |
| C08L 63/02 | (2006.01) |
| C08L 63/04 | (2006.01) |
| C08L 83/04 | (2006.01) |
| C09D 163/00 | (2006.01) |
| C09D 163/02 | (2006.01) |
| C09J 163/00 | (2006.01) |
| C09J 163/02 | (2006.01) |

(52) U.S. Cl.
CPC .............. *C08L 63/04* (2013.01); *B32B 27/38* (2013.01); *C08G 59/226* (2013.01); *C08G 59/245* (2013.01); *C08G 59/4021* (2013.01); *C08G 59/68* (2013.01); *C08K 3/013* (2018.01); *C08L 25/10* (2013.01); *C08L 83/04* (2013.01); *C09D 163/00* (2013.01); *C09J 163/00* (2013.01); *C08G 2150/00* (2013.01); *C08G 2170/00* (2013.01); *C08K 2201/019* (2013.01); *C08L 2205/18* (2013.01); *C08L 2207/53* (2013.01); *C08L 2312/06* (2013.01)

(58) Field of Classification Search
None
See application file for complete search history.

(56) References Cited

U.S. PATENT DOCUMENTS

| | | |
|---|---|---|
| 4,793,867 A | 12/1988 | Charles et al. |
| 5,223,172 A | 6/1993 | Seyerl et al. |
| 5,290,857 A | 3/1994 | Ashida et al. |
| 5,588,989 A | 12/1996 | Vonk et al. |
| 5,686,509 A | 11/1997 | Nakayama et al. |
| 6,037,392 A | 3/2000 | Tang et al. |
| 6,111,015 A | 8/2000 | Eldin et al. |
| 6,579,588 B2 | 6/2003 | Waid |
| 7,438,782 B2 | 10/2008 | Sheasley et al. |
| 7,749,368 B2 | 7/2010 | McMurdie et al. |
| 7,892,396 B2 | 2/2011 | Sheasley |
| 7,919,555 B2 | 4/2011 | Agarwal et al. |
| 8,088,245 B2 | 1/2012 | Lutz et al. |

(Continued)

FOREIGN PATENT DOCUMENTS

| | | | | |
|---|---|---|---|---|
| CN | 102311612 A | | 1/2012 | |
| CN | 103270073 A | * | 8/2013 | ........... C08G 59/182 |

(Continued)

OTHER PUBLICATIONS

Machine Translation of WO-2018115080-A1 (no date).*
DYHARD® Product Line Information, provided by AlzChem. (Year: 2013).*
Kane Ace™ Product properties, provided by Kaneka. www.kaneka.be/products/liquid-polymers/kane-ace-mx (Year: 2018).*
Omicure® DDA 10 Technical bulletin, provided by CVC Thermoset Specialties. (Year: 2020).*
EPON™ and EPI-REZ™ Epoxy Resins Product Selector, provided by Momentive. (Year: 2012).*

(Continued)

*Primary Examiner* — Michael J Feely
(74) *Attorney, Agent, or Firm* — Ashley N. Crane; Alicia M. Passerin

(57) ABSTRACT

Disclosed herein is a composition comprising: an epoxy-containing component, elastomeric particles in an amount of greater than 11% by weight to 25% by weight based on total weight of the composition; and a curing component activatable by an external energy source, the curing component comprising at least one guanidine having a D90 particle size of 25 μm measured by dynamic light scattering. Also disclosed is the composition in an at least partially cured state. Also disclosed is a method for treating a substrate comprising applying the composition to a surface of a substrate; and applying an external energy source to cure the composition. Also disclosed are substrates comprising the composition. Also disclosed are substrates formed by the method of the present invention.

13 Claims, 1 Drawing Sheet

(56) References Cited

U.S. PATENT DOCUMENTS

| | | |
|---|---|---|
| 8,222,324 B2 | 7/2012 | Yamaguchi et al. |
| 8,673,091 B2 | 3/2014 | Mcmillen et al. |
| 8,680,180 B2 | 3/2014 | Yamaguchi et al. |
| 8,791,195 B2 | 7/2014 | Christiansen, III et al. |
| 8,796,361 B2 | 8/2014 | Asay et al. |
| 8,895,148 B2 | 11/2014 | Sang et al. |
| 9,562,175 B2 | 2/2017 | Asay et al. |
| 9,644,062 B2 | 5/2017 | Xie et al. |
| 9,701,811 B2 | 7/2017 | Liang et al. |
| 9,841,061 B2 | 12/2017 | Bachmaier et al. |
| 10,316,212 B2 | 6/2019 | Jing et al. |
| 10,329,464 B2 | 6/2019 | Chen et al. |
| 10,377,928 B2 | 8/2019 | Chao et al. |
| 10,808,152 B2 | 10/2020 | Hoshi et al. |
| 10,947,428 B2 | 3/2021 | Desai et al. |
| 11,242,427 B2 | 2/2022 | Nakajima et al. |
| 11,629,276 B2 | 4/2023 | Desai et al. |
| 11,732,125 B2 * | 8/2023 | Pollum, Jr. ............. C08L 63/04 525/524 |
| 2007/0251419 A1 | 11/2007 | Yamaguchi et al. |
| 2008/0188609 A1 | 8/2008 | Agarwal et al. |
| 2009/0294057 A1 | 12/2009 | Liang et al. |
| 2010/0108259 A1 | 5/2010 | Aspin |
| 2012/0128499 A1 | 5/2012 | Desai et al. |
| 2012/0129980 A1 | 5/2012 | Desai et al. |
| 2014/0150970 A1 | 6/2014 | Desai et al. |
| 2014/0162044 A1 | 6/2014 | Lee et al. |
| 2014/0299270 A1 | 10/2014 | Asay et al. |
| 2015/0166825 A1 | 6/2015 | Godschalx et al. |
| 2016/0053045 A1 | 2/2016 | Anderson et al. |
| 2016/0083633 A1 | 3/2016 | Desai et al. |
| 2016/0230036 A1 | 8/2016 | Jing et al. |
| 2017/0107318 A1 | 4/2017 | Nakajima et al. |
| 2017/0166789 A1 | 6/2017 | Nakajima et al. |
| 2017/0313918 A1 | 11/2017 | Kasahara et al. |
| 2017/0349795 A1 | 12/2017 | Balijepalli et al. |
| 2018/0341930 A1 | 11/2018 | Moir et al. |
| 2019/0284454 A1 * | 9/2019 | Eagle ............. C08L 21/00 |
| 2022/0204822 A1 | 6/2022 | Desai et al. |
| 2022/0204823 A1 | 6/2022 | Desai et al. |
| 2022/0213362 A1 | 7/2022 | Desai et al. |
| 2023/0357562 A1 * | 11/2023 | Pollum, Jr. ............. B32B 27/38 |

FOREIGN PATENT DOCUMENTS

| | | | |
|---|---|---|---|
| CN | 104053694 A * | 9/2014 | ............. B82Y 30/00 |
| CN | 105385396 A | 3/2016 | |
| EP | 2231788 A1 | 9/2010 | |
| JP | S5789875 A2 | 6/1982 | |
| JP | S58021419 A2 | 2/1983 | |
| JP | S58168619 A2 | 10/1983 | |
| JP | 2004-018803 A2 | 1/2004 | |
| JP | 2009-506169 A2 | 2/2009 | |
| JP | 2010-084083 A2 | 4/2010 | |
| JP | 2011-157491 A2 | 8/2011 | |
| JP | 6067828 B2 | 6/2016 | |
| JP | 2016-199673 A2 | 12/2016 | |
| WO | WO2007025007 A1 | 3/2007 | |
| WO | WO2008045270 A1 | 4/2008 | |
| WO | WO2010011710 A2 | 1/2010 | |
| WO | WO2011016385 A1 | 2/2011 | |
| WO | WO2012087546 A1 | 6/2012 | |
| WO | WO2013086277 A2 | 6/2013 | |
| WO | WO2014039062 A1 | 3/2014 | |
| WO | WO2014043047 A2 | 3/2014 | |
| WO | WO2014201369 A1 | 12/2014 | |
| WO | WO2016081376 A1 | 5/2016 | |
| WO | WO2017205175 A1 | 11/2017 | |
| WO | WO-2018115080 A1 * | 6/2018 | ......... C08G 59/1477 |
| WO | WO2019065663 A1 | 4/2019 | |

OTHER PUBLICATIONS

Bain et al., "Failure processes governing high-rate impact resistance of epoxy resins filled with core-shell rubber nanoparticles", J Materials Sci., 2016, 51(5), 2347-2370.

Ok et al., "Impact Optimized Performance of Epoxy/Polyamide/CSR(Core Shell Rubber)/Anhydride Blends at Low Temperature", Molecular Crystals and liquid crystals, 2013, 579(1), 55-61.

International Standard (ISO) 13320, 2nd edition, Jan. 2020: Particle size analysis—Laser diffraction methods. (2020).

International Standard (ISO) 13320, First edition, Oct. 1, 2009: Particle size analysis—Laser diffraction methods. (2009).

ASTM International, Designation: D4464—15 (Reapproved 2020): Standard Test Method for Particle Size Distribution of Catalytic Materials by Laser Light Scattering1. (2020).

* cited by examiner

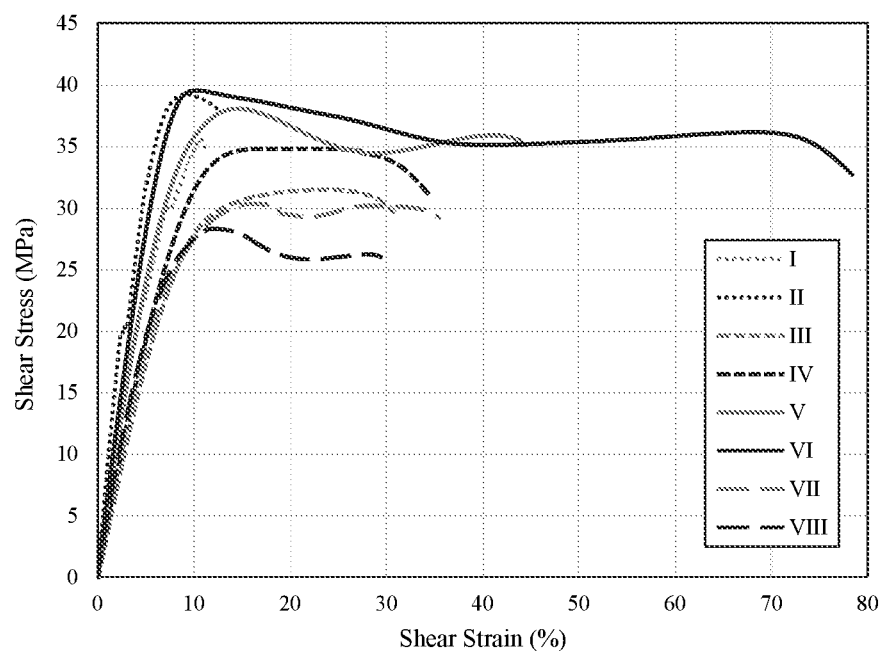

COATING COMPOSITIONS

CROSS-REFERENCE TO RELATED APPLICATIONS

This application claims the benefit of U.S. patent application Ser. No. 16/968,848, filed on Aug. 10, 2020, as a national phase entry of Int'l App. Ser. No. PCT/US2018/064695, filed on Dec. 10, 2018, that claimed the benefit of U.S. Prov. App. Ser. No. 62/628,540, filed on Feb. 9, 2018, and U.S. Prov. App. Ser. No. 62/630,473, filed on Feb. 14, 2018, each of which are incorporated herein by reference.

GOVERNMENT CONTRACT

This invention was made with Government support under Government Contract No. 13-02-0046 TARDEC Fastener/Lightweight awarded by TARDEC. The United States Government has certain rights in this invention.

FIELD OF THE INVENTION

The present invention relates to compositions, for example sealant, adhesive, and coating compositions, and to sealants, adhesives, and coatings.

BACKGROUND OF THE INVENTION

Coating compositions, including sealants and adhesives, are utilized in a wide variety of applications to treat a variety of substrates or to bond together two or more substrate materials.

The present invention is directed toward one-component compositions, including adhesive compositions that provide sufficient bond strength and are easy to apply for use in bonding together substrate materials.

SUMMARY OF THE INVENTION

Disclosed herein is a composition comprising: an epoxy-containing component comprising bisphenol F and/or a novolac resin; elastomeric particles in an amount of greater than 11% by weight to 25% by weight based on total weight of the composition; and a curing component activatable by an external energy source, the curing component comprising at least one guanidine having a D90 particle size of 25 μm measured by dynamic light scattering.

Also disclosed herein is a composition comprising an epoxy-containing component; elastomeric particles in an amount of greater than 11% by weight to 25% by weight based on total weight of the composition; and a curing component activatable by an external energy source, the curing component comprising at least one guanidine comprising a D90 particle size of 25 μm measured by dynamic light scattering, wherein no more than 50% of the elastomeric particles comprise a polybutadiene core and/or a siloxane core based on total weight of the elastomeric particles.

Also disclosed herein is a composition comprising an epoxy-containing component; elastomeric particles in an amount of greater than 11% by weight to 25% by weight based on total weight of the composition; and a curing component activatable by an external energy source, the curing component comprising at least one guanidine; wherein the composition is substantially free of platy filler.

BRIEF DESCRIPTION OF THE DRAWING

FIG. 1 is a graph illustrating shear stress versus shear strain curves for compositions I through VIII (Example 1) collected according to ISO 11003-2.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "an" epoxy and "a" curing agent, a combination (i.e., a plurality) of these components can be used.

In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, or provided on but not necessarily in contact with the surface. For example, a coating composition "applied onto" a substrate does not preclude the presence of one or more other intervening coating layers of the same or different composition located between the coating composition and the substrate.

As used herein, a "coating composition" refers to a composition, e.g., a solution, mixture, or a dispersion, that, in an at least partially dried or cured state, is capable of producing a film, layer, or the like on at least a portion of a substrate surface.

As used herein, a "sealant composition" refers to a coating composition, e.g., a solution, mixture, or a dispersion, that, in an at least partially dried or cured state, has the ability to resist atmospheric conditions and particulate matter, such as moisture and temperature and at least partially block the transmission of materials, such as particulates, water, fuel, or other liquids and gasses.

As used herein, the term "structural adhesive" means an adhesive producing a load-bearing joint having both a lap shear strength of greater than 30.0 MPa, measured according to ASTM D1002-10 using 2024-T3 aluminum substrate of 1.6 mm thickness, as measured by an INSTRON 5567 machine in tensile mode with a pull rate of 1.3 mm per minute, and a lap shear displacement at failure of at least 15% of the overlap length. As defined herein, a "1K" or "one-component" coating composition, is a composition in which all of the ingredients may be premixed and stored and wherein the reactive components do not readily react at ambient or slightly thermal conditions, but instead only react upon activation by an external energy source. In the absence of activation from the external energy source, the composition will remain largely unreacted (maintaining sufficient workability in the uncured state and greater than 70% of the initial lap shear strength of the composition in the cured state after storage at 25° C. for 8 months). External energy sources that may be used to promote the curing reaction (i.e., the crosslinking of the epoxy component and the curing agent) include, for example, radiation (i.e., actinic radiation) and/or heat.

As further defined herein, ambient conditions generally refer to room temperature and humidity conditions or temperature and humidity conditions that are typically found in the area in which the adhesive is being applied to a substrate, e.g., at 10° C. to 40° C. and 5% to 80% relative humidity, while slightly thermal conditions are temperatures that are slightly above ambient temperature but are generally below the curing temperature for the coating composition (i.e. in other words, at temperatures and humidity conditions below which the reactive components will readily react and cure, e.g., >40° C. and less than 100° C. at 5% to 80% relative humidity).

As used herein, "Mw" refers to the weight average molecular weight and means the theoretical value as determined by Gel Permeation Chromatography using Waters 2695 separation module with a Waters 410 differential refractometer (RI detector) and polystyrene standards. Tetrahydrofuran (THF) used as the eluent at a flow rate of 1 ml min$^{-1}$, and two PL Gel Mixed C columns used for separation.

As used herein, the term "catalyst" means a substance that increases the rate or decreases the activation energy of a chemical reaction without itself undergoing any permanent chemical change.

As used herein, the term "latent curing agent" or "blocked curing agent" or "encapsulated curing agent" means a molecule or a compound that is activated by an external energy source prior to reacting or having a catalytic effect. For example, the latent curing agent may be in the form of a solid at room temperature and have no catalytic effect until it is heated and melts, or the latent curing agent may be reversibly reacted with a second compound that prevents any catalytic effect until the reversible reaction is reversed by the application of heat and the second compound is removed, freeing the curing agent to react or catalyze reactions.

As used herein, the term "second curing agent" means a curing agent or catalyst in the coating composition in addition to the curing component that comprises the at least one guanidine described herein.

As used herein, the term "cure", "cured" or similar terms, as used in connection with the composition described herein, means that at least a portion of the components that form the composition are crosslinked to form a coating, film, layer, or bond. Additionally, curing of the composition refers to subjecting said composition to curing conditions (e.g., elevated temperature) leading to the reaction of the reactive functional groups of the components of the composition, and resulting in the crosslinking of the components of the composition and formation of an at least partially cured coating. As used herein, the term "at least partially cured" with respect to a coating refers to a coating formed by subjecting the composition to curing conditions such that a chemical reaction of at least a portion of the reactive groups of the components of the composition occurs to form a coating, film, layer, or bond. A coating composition may be considered to be "at least partially cured" if it has a lap shear strength of at least 1 MPa (measured according to ASTM D1002-10). The coating composition may also be subjected to curing conditions such that a substantially complete cure is attained and wherein further curing results in no significant further improvement in the coating properties such as, for example, increased lap shear performance.

As used herein, unless indicated otherwise, the term "substantially free" means that a particular material is not purposefully added to a mixture or composition, respectively, and is only present as an impurity in a trace amount of less than 5% by weight based on a total weight of the mixture or composition, respectively. As used herein, unless indicated otherwise, the term "essentially free" means that a particular material is only present in an amount of less than 2% by weight based on a total weight of the mixture or composition, respectively. As used herein, unless indicated otherwise, the term "completely free" means that a mixture or composition, respectively, does not comprise a particular material, i.e., the mixture or composition comprises 0% by weight of such material.

The present invention is directed to a composition comprising, or consisting essentially of, or consisting of, an epoxy-containing component, elastomeric particles in an amount of greater than 11% by weight to 25% by weight based on total weight of the composition; and a curing component activatable by an external energy source, the curing component comprising at least one guanidine having a D90 particle size of 25 μm measured by dynamic light scattering. As used herein, the term "D90" means the point in the size distribution in which 80 percent or more of the total volume of material in the sample is contained. For example, a D90 of 25 μm means that 90% of the particles of the sample have a size of 25 μm or smaller. The composition may be a coating composition, such as a sealant composition or an adhesive composition which, in an at least partially cured state, may form a coating, such as an adhesive or a sealant.

Also disclosed is a method for forming a coating on a substrate surface comprising, or consisting essentially of, or consisting of, applying a composition to at least a portion of the substrate surface. The composition may comprise, or consist essentially of, or consist of, an epoxy-containing component, elastomeric particles in an amount of greater than 11% by weight to 25% by weight based on total weight of the composition, and a curing component activatable by an external energy source, the curing component comprising at least one guanidine having a D90 particle size of 25 μm measured by dynamic light scattering.

Also disclosed is a method for forming a bond between two substrates comprising, or consisting essentially of, or consisting of, applying a composition to at least a portion of a surface of the first substrate, such that the composition is located between the first and the second substrate; and applying an external energy source to cure the composition. The composition may comprise, or consist essentially of, or consist of, an epoxy-containing component, elastomeric particles in an amount of greater than 11% by weight to 25% by weight based on total weight of the composition, and a curing component activatable by an external energy source, the curing component comprising at least one guanidine having a D90 particle size of 25 μm measured by dynamic light scattering.

Also disclosed are substrates and articles comprising, or consisting essentially of, or consisting of, coatings formed from the compositions of the present invention. For example, also disclosed is a coated substrate, wherein at least a portion of a surface of the substrate is at least partially coated with a composition comprising, or consisting essentially of, or consisting of, an epoxy-containing component, elastomeric particles in an amount of greater than 11% by weight to 25% by weight based on total weight of the composition, and a curing component activatable by an external energy source, the curing component comprising at least one guanidine having a D90 particle size of 25 μm measured by dynamic light scattering. Also disclosed is an article comprising, or consisting essentially of, or consisting of, first and second substrates and a composition positioned therebetween and in an at least partially cured state, wherein the composition comprises, or consists essentially of, or consists of, an epoxy-containing component, elastomeric particles in an amount of greater than 11% by weight to 25% by weight based on total weight of the composition, and a curing component activatable by an external energy source, the curing component comprising at least one guanidine having a D90 particle size of 25 μm measured by dynamic light scattering.

The coating composition may comprise an epoxy compound. Suitable epoxy compounds that may be used include monoepoxides, polyepoxides, or combinations thereof.

Suitable monoepoxides that may be used include monoglycidyl ethers of alcohols and phenols, such as phenyl glycidyl ether, n-butyl glycidyl ether, cresyl glycidyl ether, isopropyl glycidyl ether, glycidyl versatate, for example, CARDURA E available from Shell Chemical Co., and glycidyl esters of monocarboxylic acids such as glycidyl neodecanoate, and mixtures of any of the foregoing.

Useful epoxy-containing components that can be used include polyepoxides (having an epoxy functionality greater than 1), epoxy adducts, or combinations thereof. Suitable polyepoxides include polyglycidyl ethers of Bisphenol A, such as Epon® 828 and 1001 epoxy resins, and Bisphenol F polyepoxides, such as Epon® 862, which are commercially available from Hexion Specialty Chemicals, Inc. Other useful polyepoxides include polyglycidyl ethers of polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, and epoxy novolac resins. Still other non-limiting epoxy compounds include epoxidized Bisphenol A novolacs, epoxidized phenolic novolacs, epoxidized cresylic novolac, isosorbide diglycidyl ether, triglycidyl p-aminophenol, and triglycidyl p-aminophenol bismaleimide, triglycidyl isocyanurate, tetraglycidyl 4,4'-diaminodiphenylmethane, and tetraglycidyl 4,4'-diaminodiphenylsulphone. The epoxy-containing compound may also comprise an epoxy-dimer acid adduct. The epoxy-dimer acid adduct may be formed as the reaction product of reactants comprising a diepoxide compound (such as a polyglycidyl ether of Bisphenol A) and a dimer acid (such as a C36 dimer acid). The epoxy-containing compound may also comprise a carboxyl-terminated butadiene-acrylonitrile copolymer modified epoxy-containing compound. The epoxy-containing compound may also comprise epoxidized castor oil. The epoxy-containing compound may also comprise an epoxy-containing acrylic, such as glycidyl methacrylate.

The epoxy-containing compound may comprise an epoxy-adduct. The composition may comprise one or more epoxy-adducts. As used herein, the term "epoxy-adduct" refers to a reaction product comprising the residue of an epoxy compound and at least one other compound that does not include an epoxide functional group. For example, the epoxy-adduct may comprise the reaction product of reactants comprising: (1) an epoxy compound, a polyol, and an anhydride; (2) an epoxy compound, a polyol, and a diacid; or (3) an epoxy compound, a polyol, an anhydride, and a diacid.

The epoxy compound used to form the epoxy-adduct may comprise any of the epoxy-containing compounds listed above that may be included in the composition.

The polyol used to form the epoxy-adduct may include diols, triols, tetraols and higher functional polyols. Combinations of such polyols may also be used. The polyols may be based on a polyether chain derived from ethylene glycol, propylene glycol, butylene glycol, hexylene glycol and the like as well as mixtures thereof. The polyol may also be based on a polyester chain derived from ring opening polymerization of caprolactone (referred to as polycaprolactone-based polyols hereinafter). Suitable polyols may also include polyether polyols, polyurethane polyols, polyurea polyols, acrylic polyols, polyester polyols, polybutadiene polyols, hydrogenated polybutadiene polyols, polycarbonate polyols, polysiloxane polyols, and combinations thereof. Polyamines corresponding to polyols may also be used, and in this case, amides instead of carboxylic esters will be formed with the diacids and anhydrides.

The polyol may comprise a polycaprolactone-based polyol. The polycaprolactone-based polyols may comprise diols, triols or tetraols terminated with primary hydroxyl groups. Commercially available polycaprolactone-based polyols include those sold under the trade name Capa™ from Perstorp Group, such as, for example, Capa 2054, Capa 2077A, Capa 2085, Capa 2205, Capa 3031, Capa 3050, Capa 3091 and Capa 4101.

The polyol may comprise a polytetrahydrofuran-based polyol. The polytetrahydrofuran-based polyols may comprise diols, triols or tetraols terminated with primary hydroxyl groups. Commercially available polytetrahydrofuran-based polyols include those sold under the trade name Terathane®, such as Terathane® PTMEG 250 and Terathane® PTMEG 650 which are blends of linear diols in which the hydroxyl groups are separated by repeating tetramethylene ether groups, available from Invista. In addition, polyols based on dimer diols sold under the trade names Pripol®, Solvermol™ and Empol®, available from Cognis Corporation, or bio-based polyols, such as the tetrafunctional polyol Agrol 4.0, available from BioBased Technologies, may also be utilized.

The anhydride that may be used to form the epoxy-adduct may comprise any suitable acid anhydride known in the art. For example, the anhydride may comprise hexahydrophthalic anhydride and its derivatives (e.g., methyl hexahydrophthalic anhydride); phthalic anhydride and its derivatives (e.g., methyl phthalic anhydride); maleic anhydride; succinic anhydride; trimelletic anhydride; pyromellitic dianhydride (PMDA); 3,3',4,4'-oxydiphthalic dianhydride (ODPA); 3,3',4,4'-benzopherone tetracarboxylic dianhydride (BTDA); and 4,4'-diphthalic (hexafluoroisopropylidene) anhydride (6FDA).

The diacid used to form the epoxy-adduct may comprise any suitable diacid known in the art. For example, the diacids may comprise phthalic acid and its derivates (e.g., methyl phthalic acid), hexahydrophthalic acid and its derivatives (e.g., methyl hexahydrophthalic acid), maleic acid, succinic acid, adipic acid, and the like.

The epoxy-adduct may comprise a diol, a monoanhydride or a diacid, and a diepoxy compound, wherein the mole ratio of diol, monoanhydride (or diacid), and diepoxy compounds in the epoxy-adduct may vary from 0.5:0.8:1.0 to 0.5:1.0:6.0.

The epoxy-adduct may comprise a triol, a monoanhydride or a diacid, and a diepoxy compound, wherein the mole ratio of triol, monoanhydride (or diacid), and diepoxy compounds in the epoxy-adduct may vary from 0.5:0.8:1.0 to 0.5:1.0:6.0.

The epoxy-adduct may comprise a tetraol, a monoanhydride or a diacid, and a diepoxy compound, wherein the mole ratio of tetraol, monoanhydride (or diacid), and diepoxy compounds in the epoxy-adduct may vary from 0.5:0.8:1.0 to 0.5:1.0:6.0.

Other suitable epoxy-containing components include epoxy-adducts such as epoxy polyesters formed as the reaction product of reactants comprising an epoxy-containing compound, a polyol and an anhydride, as described in U.S. Pat. No. 8,796,361, col. 3, line 42 through col. 4, line 65, the cited portion of which is incorporated herein by reference.

The epoxy-containing component may have an average epoxide functionality of greater than 1.0, such as at least 1.8, and may have an average epoxide functionality of less than 3.2, such as no more than 2.8. The epoxy-containing component may have an average epoxide functionality of greater than 1.0 to less than 3.2, such as 1.8 to 2.8. As used herein, the term "average epoxide functionality" means the molar ratio of epoxide functional groups to epoxide-containing molecules in the composition.

According to the present invention, the epoxy-containing component may be present in the composition in an amount of at least 45% by weight based on the total composition weight, such as at least 55%, and in some cases may be present in the coating composition in an amount of no more than 90% by weight based on the total composition weight, such as no more than 85%. According to the present invention, the epoxy-containing component may be present in the coating composition in an amount of from 45% to 90% by weight based on the total composition weight, such as from 55% to 85%.

According to the present invention, the epoxy equivalent weight of the epoxy-containing component of the coating composition may be at least 40 g/eq, such as at least 74 g/eq, such as at least 160 g/eq, such as at least 200 g/eq, such as at least 500 g/eq, such as at least 1,000 g/eq, and in some cases may be no more than 2,000 g/eq, such as no more than 1,000 g/eq, such as no more than 500 g/eq, such as no more than 200 g/eq. According to the present invention, the epoxy equivalent weight of the epoxy-containing component of the coating composition can range from 40 g/eq to 2,000 g/eq, such as from 100 g/eq to 1,000 g/eq, such as from 160 g/eq to 500 g/eq. As used herein, the "epoxy equivalent weight" is determined by dividing the molecular weight of the epoxy-containing component by the number of epoxy groups present in the epoxy-containing component.

According to the present invention, the molecular weight (Mw) of the epoxy-containing component of the coating composition may be at least 40 g/mol, such as at least 74 g/mol, such as at least 198 g/mol, such as at least 310 g/mol, such as at least 500 g/mol, such as at least 1,000 g/mol, and in some cases no more than 20,000 g/mol, such as no more than 4,000 g/mol, such as no more than 2,000 g/mol, such as no more than 400 g/mol, such as no more than 300 g/mol. According to the present invention, the molecular weight of the epoxy-containing component of the coating composition resin can range from 40 g/mol to 20,000 g/mol, such as from 198 g/mol to 4,000 g/mol, such as from 310 g/mol to 2,000 g/mol, such as from 500 g/mol to 1,000 g/mol.

The coating composition according to the present invention further comprises elastomeric particles. As used herein, "elastomeric particles" refers to particles comprised of one or more materials having at least one glass transition temperature (Tg) of greater than −150° C. and less than 30° C., calculated, for example, using the Fox Equation. The elastomeric particles may be phase-separated from the epoxy-containing component. As used herein, the term "phase-separated" means forming a discrete domain within a matrix of the epoxy-containing component.

The elastomeric particles may have a core/shell structure. Suitable core-shell elastomeric particles may be comprised of an acrylic shell and an elastomeric core. The core may comprise natural or synthetic rubbers, polybutadiene, styrene-butadiene, polyisoprene, chloroprene, acrylonitrile butadiene, butyl rubber, polysiloxane, polysulfide, ethylene-vinyl acetate, fluoroelastomer, polyolefin, or combinations thereof.

According to the present invention, the average particle size of the elastomeric particles may be at least 20 nm, as measured by transmission electron microscopy (TEM), such as at least 30 nm, such as at least 40 nm, such as at least 50 nm, and may be no more than 400 nm, such as no more than 300 nm, such as no more than 200 nm, such as no more than 150 nm. According to the present invention, the average particle size of the elastomeric particles may be 20 nm to 400 nm as measured by TEM, such as 30 nm, to 300 nm, such as 40 nm to 200 nm, such as 50 nm to 150 nm. Suitable methods of measuring particle sizes by TEM include suspending elastomeric particles in a solvent selected such that the particles do not swell, and then drop casting the suspension onto a TEM grid which is allowed to dry under ambient conditions. For example, epoxy resin containing core-shell rubber elastomeric particles from Kaneka Texas Corporation can be diluted in butyl acetate for drop casting. Particle size measurements may be obtained from images acquired using a Tecnai T20 TEM operating at 200 kV and analyzed using ImageJ software, or an equivalent instrument and software.

According to the present invention, the elastomeric particles may optionally be included in an epoxy carrier resin for introduction into the coating composition. Suitable finely dispersed core-shell elastomeric particles in an average particle size ranging from 20 nm to 400 nm may be master-batched in epoxy resin such as aromatic epoxides, phenolic novolac epoxy resin, bisphenol A and/or bisphenol F diepoxide, and/or aliphatic epoxides, which include cyclo-aliphatic epoxides, at concentrations ranging from 1% to 80% core-shell elastomeric particles by weight based on the total weight of the elastomeric dispersion, such as from 5% to 50%, such as from 15% to 35%. Suitable epoxy resins may also include a mixture of epoxy resins. When utilized, the epoxy carrier resin may be an epoxy-containing component of the present invention such that the weight of the epoxy-containing component present in the coating composition includes the weight of the epoxy carrier resin.

Exemplary non-limiting commercial core-shell elastomeric particle products using poly(butadiene) rubber particles that may be utilized in the coating composition of the present invention include core-shell poly(butadiene) rubber powder (commercially available as PARALOID™ EXL 2650A from Dow Chemical), a core-shell poly(butadiene) rubber dispersion (25% core-shell rubber by weight) in bisphenol F diglycidyl ether (commercially available as Kane Ace MX 136), a core-shell poly(butadiene) rubber dispersion (33% core-shell rubber by weight) in Epon® 828 (commercially available as Kane Ace MX 153), a core-shell poly(butadiene) rubber dispersion (33% core-shell rubber by weight) in Epiclon® EXA-835LV (commercially available as Kane Ace MX 139), a core-shell poly(butadiene) rubber dispersion (37% core-shell rubber by weight) in bisphenol A diglycidyl ether (commercially available as Kane Ace MX 257), and a core-shell poly(butadiene) rubber dispersion (37% core-shell rubber by weight) in Epon® 863 (commercially available as Kane Ace MX 267), each available from Kaneka Texas Corporation.

Exemplary non-limiting commercial core-shell elastomeric particle products using styrene-butadiene rubber particles that may be utilized in the coating composition include a core-shell styrene-butadiene rubber powder (commercially available as CLEARSTRENGTH® XT100 from Arkema), core-shell styrene-butadiene rubber powder (commercially available as PARALOID™ EXL 2650J), a core-shell styrene-butadiene rubber dispersion (33% core-shell rubber by weight) in bisphenol A diglycidyl ether (commercially available as Fortegra™ 352 from Olin™), core-shell styrene-butadiene rubber dispersion (33% rubber by weight) in low viscosity bisphenol A diglycidyl ether (commercially available as Kane Ace MX 113), a core-shell styrene-butadiene rubber dispersion (25% core-shell rubber by weight) in bisphenol A diglycidyl ether (commercially available as Kane Ace MX 125), a core-shell styrene-butadiene rubber dispersion (25% core-shell rubber by weight) in bisphenol F diglycidyl ether (commercially available as Kane Ace MX 135), a core-shell styrene-butadiene rubber dispersion (25% core-shell rubber by weight) in D.E.N.™-438 phenolic novolac epoxy (commercially available as Kane Ace MX 215), a core-shell styrene-butadiene rubber dispersion (25% core-shell rubber by weight) in Araldite® MY-721 multi-functional epoxy (commercially available as Kane Ace MX 416), a core-shell styrene-butadiene rubber dispersion (25% core-shell rubber by weight) in MY-0510 multi-functional epoxy (commercially available as Kane Ace MX 451), a core-shell styrene-butadiene rubber dispersion (25% core-shell rubber by weight) in Syna Epoxy 21 Cyclo-aliphatic Epoxy from Synasia (commercially available as Kane Ace MX 551), and a core-shell styrene-butadiene rubber dispersion (25% core-shell rubber by weight) in polypropylene glycol (MW 400) (commercially available as Kane Ace MX 715), each available from Kaneka Texas Corporation.

Exemplary non-limiting commercial core-shell elastomeric particle products using polysiloxane rubber particles that may be utilized in the coating composition of the present invention include a core-shell polysiloxane rubber powder (commercially available as GENIOPERL® P52 from Wacker), a core-shell polysiloxane rubber dispersion (40% core-shell rubber by weight) in bisphenol A diglycidyl ether (commercially available as ALBIDUR® EP2240A from Evonick), a core-shell polysiloxane rubber dispersion (25% core-shell rubber by weight) in jER™828 (commercially available as Kane Ace MX 960), a core-shell polysiloxane rubber dispersion (25% core-shell rubber by weight) in Epon® 863 (commercially available as Kane Ace MX 965) each available from Kaneka Texas Corporation.

The elastomeric particles may be present in the composition in an amount of greater than 11% by weight based on the total composition weight, such as at least 15%, and in some cases may be present in the composition in an amount of no more than 40% by weight based on the total composition weight, such as no more than 35%, such as no more than 25%. According to the present invention, the elastomeric particles may be present in the composition in an amount of from greater than 11% to 40% by weight based on the total composition weight, such as greater than 11% to 25%, such as from 15% to 25%.

According to the present invention, at least 50% by weight of the elastomeric particles comprise a styrene butadiene core based on total weight of the elastomeric particles in the coating composition. For example, elastomeric particles comprising a styrene butadiene core may be present in the coating composition in an amount of at least 50% by weight based on total weight of the elastomeric particles, such as at least 65% by weight, such as at least 75% by weight, and may be present in an amount of 100% by weight based on total weight of elastomeric particles in the coating composition, such as no more 95% by weight, such as no more than 90% by weight. Elastomeric particles comprising a styrene butadiene core may be present in the coating composition in an amount of 50% by weight to 100% by weight based on total weight of the elastomeric particles in the coating composition, such as 65% by weight to 95% by weight, such as 75% by weight to 90% by weight.

According to the present invention, at least 50% by weight of the elastomeric particles have an average particle size (based on TEM as described herein) of no more than 150 nm based on total weight of the elastomeric particles in the coating composition, such as 50 nm to 150 nm. For example, elastomeric particles having an average particle size (based on TEM as described herein) of no more than 150 nm, such as 50 nm to 150 nm, may be present in the coating composition in an amount of at least 50% by weight based on total weight of the elastomeric particles, such as at least 65% by weight, such as at least 75% by weight, and may be present in an amount of 100% by weight based on total weight of elastomeric particles in the coating composition, such as no more 95% by weight, such as no more than 90% by weight. Elastomeric particles having an average particle size of 150 nm (based on TEM as described herein), such as 50 nm to 150 nm, may be present in the coating composition in an amount of 50% by weight to 100% by weight based on total weight of the elastomeric particles in the coating composition, such as 65% by weight to 95% by weight, such as 75% by weight to 90% by weight.

According to the present invention, no more than 50% by weight of the elastomeric particles comprise a polybutadiene core based on total weight of the elastomeric particles in the coating composition. For example, if elastomeric particles containing a polybutadiene core are present at all, they may be present in an amount of at least 5% by weight based on total weight of the elastomeric particles, such as at least 10%, and may be present in an amount of no more than 50% by weight based on total weight of the elastomeric particles, such as no more than 35% by weight, such as no more than 25% by weight. Elastomeric particles containing a polybutadiene core may be present in the coating composition of the present invention in an amount of 0% by weight to 50% by weight based on total weight of the elastomeric particles, such as 5% by weight to 35%, such as 10% by weight to 25% by weight.

According to the present invention, no more than 50% by weight of the elastomeric particles comprise a polysiloxane core based on total weight of the elastomeric particles in the coating composition. For example, if elastomeric particles containing a polysiloxane core are present at all, they may be present in an amount of at least 5% by weight based on total weight of the elastomeric particles, such as at least 10%, and may be present in an amount of no more than 50% by weight based on total weight of the elastomeric particles, such as no more than 35% by weight, such as no more than 25% by weight. Elastomeric particles comprising a polysiloxane core may be present in the coating composition of the present invention in an amount of 0% by weight to 50% by weight based on total weight of the elastomeric particles, such as 5% by weight to 35%, such as 10% by weight to 25% by weight.

The composition of the present invention further comprises a curing component activatable by an external energy source, the curing component comprising, or consisting essentially of, or consisting of, a guanidine. It will be understood that "guanidine," as used herein, refers to guanidine and derivatives thereof. For example, the curing component that may be used includes guanidines, substituted guanidines, substituted ureas, melamine resins, guanamine derivatives, heat-activated cyclic tertiary amines, aromatic amines and/or mixtures thereof. Examples of substituted guanidines are methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine and, more especially, cyanoguanidine (dicyandiamide, e.g. Dyhard® available from AlzChem). Representatives of suitable guanamine derivatives which may be mentioned are alkylated benzoguanamine resins, benzoguanamine resins or methoxymethylethoxymethylbenzoguanamine.

For example, the guanidine may comprise a compound, moiety, and/or residue having the following general structure:

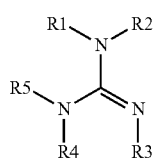

(I)

wherein each of R1, R2, R3, R4, and R5 (i.e., substituents of structure (I)) comprise hydrogen, (cyclo)alkyl, aryl, aromatic, organometallic, a polymeric structure, or together can form a cycloalkyl, aryl, or an aromatic structure, and wherein R1, R2, R3, R4, and R5 may be the same or different. As used herein, "(cyclo)alkyl" refers to both alkyl and cycloalkyl. When any of the R groups "together can form a (cyclo)alkyl, aryl, and/or aromatic group", it is meant that any two adjacent R groups are connected to form a cyclic moiety, such as the rings in structures (II)-(V) below.

It will be appreciated that the double bond between the carbon atom and the nitrogen atom that is depicted in structure (I) may be located between the carbon atom and another nitrogen atom of structure (I). Accordingly, the various substituents of structure (I) may be attached to different nitrogen atoms depending on where the double bond is located within the structure.

The guanidine may comprise a cyclic guanidine such as a guanidine of structure (I) wherein two or more R groups of structure (I) together form one or more rings. In other words, the cyclic guanidine may comprise ≥1 ring(s). For example, the cyclic guanidine may either be a monocyclic guanidine (1 ring) such as depicted in structures (II) and (III) below, or the cyclic guanidine may be bicyclic or polycyclic guanidine (≥2 rings) such as depicted in structures (IV) and (V) below.

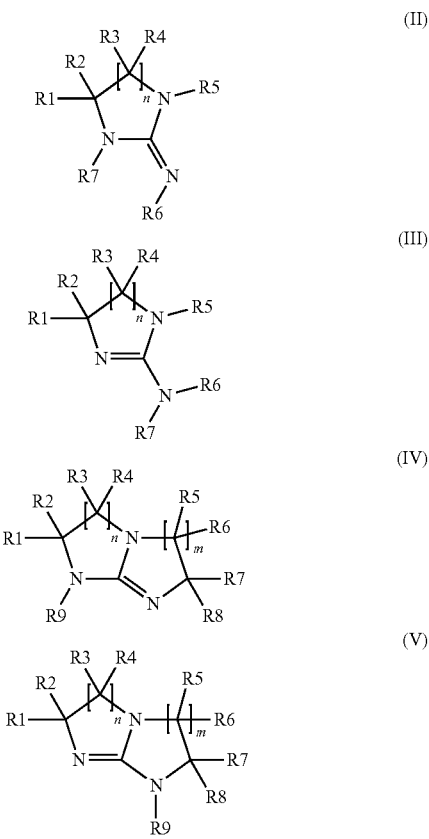

Each substituent of structures (II) and/or (III), R1-R7, may comprise hydrogen, (cyclo)alkyl, aryl, aromatic, organometallic, a polymeric structure, or together can form a cycloalkyl, aryl, or an aromatic structure, and wherein R1-R7 may be the same or different. Similarly, each substituent of structures (IV) and (V), R1-R9, may be hydrogen, alkyl, aryl, aromatic, organometallic, a polymeric structure, or together can form a cycloalkyl, aryl, or an aromatic structure, and wherein R1-R9 may be the same or different. Moreover, in some examples of structures (II) and/or (III), certain combinations of R1-R7 may be part of the same ring structure. For example, R1 and R7 of structure (II) may form part of a single ring structure. Moreover, it will be understood that any combination of substituents (R1-R7 of structures (II) and/or (III) as well as R1-R9 of structures (IV) and/or (V)) may be chosen so long as the substituents do not substantially interfere with the catalytic activity of the cyclic guanidine.

Each ring in the cyclic guanidine may be comprised of ≥5 members. For example, the cyclic guanidine may comprise a 5-member ring, a 6-member ring, and/or a 7-member ring. As used herein, the term "member" refers to an atom located in a ring structure. Accordingly, a 5-member ring will have 5 atoms in the ring structure ("n" and/or "m"=1 in structures (II)-(V)), a 6-member ring will have 6 atoms in the ring structure ("n" and/or "m"=2 in structures (II)-(V)), and a 7-member ring will have 7 atoms in the ring structure ("n" and/or "m"=3 in structures (II)-(V)). It will be appreciated that if the cyclic guanidine is comprised of ≥2 rings (e.g., structures (IV) and (V)), the number of members in each ring of the cyclic guanidine can either be the same or different. For example, one ring may be a 5-member ring while the other ring may be a 6-member ring. If the cyclic guanidine is comprised of ≥3 rings, then in addition to the combinations cited in the preceding sentence, the number of members in a first ring of the cyclic guanidine may be different from the number of members in any other ring of the cyclic guanidine.

It will also be understood that the nitrogen atoms of structures (II)-(V) may further have additional atoms attached thereto. Moreover, the cyclic guanidine may either be substituted or unsubstituted. For example, as used herein in conjunction with the cyclic guanidine, the term "substituted" refers to a cyclic guanidine wherein R5, R6, and/or R7 of structures (II) and/or (III) and/or R9 of structures (IV) and/or (V) is not hydrogen. As used herein in conjunction with the cyclic guanidine, the term "unsubstituted" refers to a cyclic guanidine wherein R1-R7 of structures (II) and/or (III) and/or R1-R9 of structures (IV) and/or (V) are hydrogen.

The cyclic guanidine may comprise a bicyclic guanidine, and the bicyclic guanidine may comprise 1,5,7-triazabicyclo [4.4.0]dec-5-ene ("TBD" or "BCG").

The guanidine may be present in the composition in an amount of at least 2% by weight based on total weight of the composition, such as at least 5% by weight, and may be present in an amount of no more than 20% by weight based on total weight of the composition, such as no more than 15%, such as no more than 10%. The guanidine may be present in the composition in an amount of 2% by weight to 20% by weight based on total weight of the composition, such as 5% by weight to 15% by weight, such as 7% by weight to 12% by weight.

The guanidine particles may have a D90 particle size of 25 μm as measured by dynamic light scattering, such as a D90 particle size of 20 μm, such as a D90 particle size of 15 μm. Useful instruments useful for measuring the D90 include a LS 13 320 Laser Diffraction Particle Size Analyzer (available from Beckman Coulter) or similar instruments.

According to the present invention, the coating composition optionally may further comprise a second curing agent. The curing agent may be a latent curing agent, a blocked curing agent, an encapsulated curing agent, or combinations thereof.

Useful second curing agents may comprise amidoamine or polyamide catalysts, such as, for example, one of the Ancamide® products available from Air Products, amine, dihydrazide, or dicyandiamide adducts and complexes, such as, for example, one of the Ajicure® products available from Ajinomoto Fine Techno Company, 3,4-dichlorophenyl-N,N-dimethylurea (A.K.A. Diuron) available from Alz Chem, or combinations thereof.

According to the present invention, when utilized, the second curing agent may be present in the coating composition in an amount of at least 0.01% by weight based on the total composition weight, such as at least 1%, such as at least 5%, and in some cases may be present in the coating composition in an amount of no more than 10% by weight based on the total composition weight, such as no more than 5%, such as no more than 1%. According to the present invention, when utilized, the second curing agent may be present in the coating composition in an amount from 0.01% to 10% by weight based on the total composition weight, such as from 1% to 5%.

According to the present invention, reinforcement fillers may optionally be added to the coating composition. Useful reinforcement fillers that may be introduced to the coating composition of the present invention to provide improved mechanical materials such as fiberglass, fibrous titanium dioxide, whisker type calcium carbonate (aragonite), and carbon fiber (which includes graphite and carbon nanotubes). In addition, fiber glass ground to 5 microns or wider and to 50 microns or longer may also provide additional tensile strength.

According to the present invention, organic and/or inorganic fillers, such as those that are substantially spherical, may optionally be added to the coating composition. Useful organic fillers that may be introduced include cellulose, starch, and acrylic. Useful inorganic fillers that may be introduced include borosilicate, aluminosilicate, and calcium carbonate. The organic and inorganic fillers may be solid, hollow, or layered in composition and may range in size from 10 nm to 1 mm in at least one dimension.

Optionally, according to the present invention, additional fillers, thixotropes, colorants, tints and/or other materials also may be added to the coating composition.

Useful thixotropes that may be used include untreated fumed silica and treated fumed silica, castor wax, clay, organo clay and combinations thereof. In addition, fibers such as synthetic fibers like Aramid® fiber and Kevlar® fiber, acrylic fibers, and/or engineered cellulose fiber may also be utilized.

Useful colorants, dyes, or tints may include red iron pigment, titanium dioxide, calcium carbonate, and phthalocyanine blue and combinations thereof.

Useful fillers that may be used in conjunction with thixotropes may include inorganic fillers such as inorganic clay or silica and combinations thereof.

Exemplary other materials that may be utilized include, for example, calcium oxide and carbon black and combinations thereof.

Such fillers, if present at all, may be present in an amount of no more than 20% by weight based on total weight of the composition, such as no more than 10% by weight, such as no more than 5% by weight. Such fillers, if present at all, may be present in an amount of 0.1% to 20% by weight based on total weight of the composition, such as 1% to 15% by weight, such as 5% to 10% by weight.

Optionally, the composition may be substantially free, or essentially free, or completely free, of platy fillers such as mica, talc, pyrophyllite, chlorite, vermiculite, or combinations thereof.

Optionally, the composition may be substantially free, or essentially free, or completely free, of free radical initiators.

It has been surprisingly discovered that the addition of additives to the composition in an aggregate amount greater than 20% by weight based on total composition weight significantly reduce the lap shear strength and displacement, such as greater than 15% by weight, such as greater than 10% by weight. That is, the composition may contain up to 20% by weight additives based on total composition weight, such as up to 15% by weight, such as up to 10% by weight. In examples, the composition may be substantially free, or essentially free, or completely free, of additives. As used herein, the term "additives" refers to ingredients or components included in the coating composition in addition to the epoxy-containing component, the elastomeric particles, the guanidine curing component, the second curing agent, and the fillers described herein. Exemplary non-limiting examples of such additives include flexibilizers such as Flexibilzer® DY 965 from Huntsman Corporation, reactive liquid rubber, non-reactive liquid rubber, epoxy-amine adducts (such as those described above but, when present, different from the epoxy-containing component present in the coating composition), epoxy-thiol adducts, blocked isocyanates, capped isocyanates, epoxy-urethanes, epoxy-ureas, modified epoxies from Hexion, HELOXY™ modifiers from Hexion, adhesion promoters, silane coupling agents such as Silquest A-187 from Momentive, flame retardants, colloidal silica such as NANOPDX® dispersions from Evonik, thermoplastic resins, acrylic polymer beads such as ZEFIAC® beads from AICA Kogyo Co, or combinations thereof.

The present invention also is directed to a method for treating a substrate comprising, or consisting essentially of, or consisting of, contacting at least a portion of a surface of the substrate with one of the compositions of the present invention described hereinabove. The composition may be cured to form a coating, layer or film on the substrate surface by exposure to an external energy source, as described herein. The coating, layer or film, may be, for example, a sealant or an adhesive.

The present invention is also directed to a method for forming a bond between two substrates for a wide variety of potential applications in which the bond between the substrates provides particular mechanical properties related to both lap shear strength and displacement. The method may comprise, or consist essentially of, or consist of, applying the composition described above to a first substrate; contacting a second substrate to the composition such that the composition is located between the first substrate and the second substrate; and curing the composition by exposure to an external energy source, as described herein. For example, the composition may be applied to either one or both of the substrate materials being bonded to form an adhesive bond therebetween and the substrates may be aligned and pressure and/or spacers may be added to control bond thickness. The composition may be applied to cleaned or uncleaned (i.e., including oily or oiled) substrate surfaces.

As stated above, the composition of the present disclosure also may form a coating, such as a sealant, on a substrate or a substrate surface. The coating composition may be applied to substrate surfaces, including, by way of non-limiting example, a vehicle body or components of an automobile frame or an airplane, or to armor assemblies such as those on a tank, or to protective clothing such as body armor, personal armor, suits of armor, and the like. The sealant formed by the composition of the present invention provides sufficient lap shear strength and displacement. The composition may be applied to cleaned or uncleaned (i.e., including oily or oiled) substrate surfaces. It may also be applied to a substrate that has been pretreated, coated with an electrodepositable coating, coated with additional layers such as a primer, basecoat, or topcoat. An external energy source may subsequently be applied to cure the coating composition, such as baking in an oven.

The composition described above may be applied alone or as part of a coating system that can be deposited in a number of different ways onto a number of different substrates. The system may comprise a number of the same or different layers and may further comprise other coating compositions such as pretreatment compositions, primers, and the like. A coating, film, layer or the like is typically formed when a composition that is deposited onto the substrate is at least partially cured by methods known to those of ordinary skill in the art (e.g., by exposure to thermal heating or actinic radiation).

The composition can be applied to the surface of a substrate in any number of different ways, non-limiting examples of which include brushes, rollers, films, pellets, pressure injectors, spray guns and applicator guns. Optionally, the substrate may be 100% water break free. Optionally, the substrate may be non-water break free. As used herein, "water break free" means that water spreads evenly over the surface and does not bead up. As used herein, "non-water break free" means that water beads up over the surface.

After application to the substrate, the composition can be cured to form a coating, layer or film, such as using an external energy source such as an oven or other thermal means or through the use of actinic radiation. For example, the composition can be cured by baking and/or curing at elevated temperature, such as at a temperature of at least 80° C., such as at least 100° C., such as at least 120° C., such as at least 125° C., such as at least 130° C., and in some cases at a temperature of no more than 250° C., such as no more than 210° C., such as no more than 185° C., such as no more than 170° C., such as no more than 165° C., and in some cases at a temperature of from 80° C. to 250° C., from 120° C. to 185° C., from 125° C. to 170° C., from 130° C. to 165° C., and for any desired time period (e.g., from 5 minutes to 5 hours) sufficient to at least partially cure the coating composition on the substrate(s). The skilled person understands, however, that the time of curing varies with temperature. The coating, layer or film, may be, for example, a sealant or an adhesive, as described above.

As stated above, the present disclosure is directed to adhesive compositions that are used to bond together two substrate materials for a wide variety of potential applications in which the bond between the substrate materials provides particular mechanical properties related to combined lap shear strength and displacement. The adhesive composition may be applied to either one or both of the substrate materials being bonded such as, by way of non-limiting example, components of a vehicle. The pieces are aligned and pressure and/or spacers may be added to control bond thickness.

As stated above, the present disclosure also is directed to coating compositions that are used to coat a surface of a substrate to provide particular mechanical properties including strength and elongation. The coating composition may be applied to at least a portion of substrate surface, such as any of the substrates described herein.

It has been surprisingly discovered that the coating composition of the present invention provides, in an at least partially cured state, a coating that provides particular mechanical properties, including both increased strength and increased strain, displacement or elongation.

It has been surprisingly discovered that the coating compositions of the present invention, in the at least partially cured state (i.e., coatings of the present invention), have a hardness of greater than 100 N/mm² and an elongation of at least 40%.

It has been surprisingly discovered that the coating compositions of the present invention, in the at least partially cured state (i.e., adhesives of the present invention), have both a shear stress of at least 33.0 MPa and a shear strain of at least 34.5% measured in accordance with ISO 11003-2.

It also has been surprisingly discovered that the coating compositions of the present invention, in the at least partially cured state (i.e., adhesives of the present invention), have both a lap shear strength of greater than 30.0 MPa, measured according to ASTM D1002-10 using 2024-T3 aluminum substrate of 1.6 mm thickness, as measured by an INSTRON 5567 machine in tensile mode with a pull rate of 1.3 mm per minute, and a lap shear displacement at failure of at least 15% of the overlap length.

The substrates that may be coated by the compositions of the present invention are not limited. Suitable substrates useful in the present invention include, but are not limited to, materials such as metals or metal alloys, ceramic materials such as boron carbide or silicon carbide, polymeric materials such as hard plastics including filled and unfilled thermoplastic materials or thermoset materials, or composite materials. Other suitable substrates useful in the present invention include, but are not limited to, glass or natural materials such as wood. For example, suitable substrates include rigid metal substrates such as ferrous metals, aluminum, aluminum alloys, magnesium titanium, copper, and other metal and alloy substrates. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. Aluminum alloys of the 1XXX, 2XXX, 3XXX, 4XXX, 5XXX, 6XXX, 7XXX, or 8XXX series as well as clad aluminum alloys and cast aluminum alloys of the A356, 1XX.X, 2XX.X, 3XX.X, 4XX.X, 5XX.X, 6XX.X, 7XX.X, or 8XX.X series also may be used as the substrate. Magnesium alloys of the AZ31B, AZ91C, AM60B, or EV31A series also may be used as the substrate. The substrate used in the present invention may also comprise titanium and/or titanium alloys of grades 1-36 including H grade variants. Other suitable non-ferrous metals include copper and magnesium, as well as alloys of these materials. Suitable metal substrates for use in the present invention include those that are used in the assembly of vehicular bodies (e.g., without limitation, door, body panel, trunk deck lid, roof panel, hood, roof and/or stringers, rivets, landing gear components, and/or skins used on an aircraft), a vehicular frame, vehicular parts, motorcycles, wheels, and industrial structures and components. As used herein, "vehicle" or variations thereof includes, but is not limited to, civilian, commercial and military aircraft, and/or land vehicles such as cars, motorcycles, and/or trucks. The metal substrate also may be in the form of, for example, a sheet of metal or a fabricated part. It will also be understood that the substrate may be pretreated with a pretreatment solution including a zinc phosphate pretreatment solution such as, for example, those described in U.S. Pat. Nos. 4,793,867 and 5,588,989, or a zirconium containing pretreatment solution such as, for example, those described in U.S. Pat. Nos. 7,749,368 and 8,673,091. The substrate may comprise a composite material such as a plastic or a fiberglass composite. The substrate may be a fiberglass and/or carbon fiber composite. The compositions of the present invention are particularly suitable for use in various industrial or transportation applications including automotive, light and heavy commercial vehicles, marine, or aerospace.

ASPECTS OF THE INVENTION

In the following, some non-limiting aspects of the present invention are summarized:

Aspect 1. A composition, comprising:
 an epoxy-containing component;
 elastomeric particles in an amount of greater than 11% by weight to 25% by weight based on total weight of the composition; and
 a curing component activatable by an external energy source, the curing component comprising at least one guanidine having a D90 particle size of 25 μm measured by dynamic light scattering.

Aspect 2. The composition of Aspect 1, wherein the elastomeric particles are phase-separated from the epoxy-containing component.

Aspect 3. The composition of Aspect 1 or Aspect 2, wherein the epoxy-containing component comprises bisphenol A polyepoxide, bisphenol F polyepoxide, a novolac resin, or combinations thereof.

Aspect 4. The composition of any of the preceding Aspects, wherein the epoxy-containing component is present in an amount of 45% to 90% by weight based on total weight of the composition.

Aspect 5. The composition of any of the preceding Aspects, wherein the epoxy-containing component has an average epoxide functionality of greater than 1.0 and less than 3.2.

Aspect 6. The composition of any of the preceding Aspects, wherein the elastomeric particles have a core/shell structure.

Aspect 7. The composition of Aspect 6, wherein the elastomeric particles comprise an acrylic shell and a butadiene core.

Aspect 8. The composition of Aspect 6 or Aspect 7, wherein the butadiene core comprises styrene-butadiene, polybutadiene, or combinations thereof.

Aspect 9. The composition of any of the preceding Aspects, wherein at least 50% by weight of the elastomeric particles comprise a styrene butadiene core based on total weight of the elastomeric particles.

Aspect 10. The composition of any of the preceding Aspects, wherein at least 50% of the elastomeric particles have an average particle size of less than 150 nm as measured by transmission electron microscopy.

Aspect 11. The composition of any of the preceding Aspects, wherein no more than 50% by weight of the elastomeric particles comprise a polybutadiene core and/or a polysiloxane core based on total weight of the elastomeric particles.

Aspect 12. The composition of any of the preceding Aspects, wherein less than 50% of the elastomeric particles have an average particle size of greater than 150 nm as measured by transmission electron microscopy.

Aspect 13. The composition of any of the preceding Aspects, wherein the at least one guanidine comprises dicyandiamide.

Aspect 14. The composition of any of the preceding Aspects, wherein the at least one guanidine is present in an amount of 2% to 20% based on total weight of the composition.

Aspect 15. The composition of any of the preceding Aspects, wherein the at least one guanidine comprises particles having a D90 particle size of 20 μm.

Aspect 16. The composition of any of the preceding Aspects, further comprising fillers.

Aspect 17. The composition of Aspect 16, wherein the fillers are present in an amount of no more than 20% by weight based on total weight of the composition.

Aspect 18. The composition of any of Aspects 1 to 15, wherein the composition is substantially free of platy fillers.

Aspect 19. The composition of any of the preceding Aspects, further comprising additives.

Aspect 20. The composition of Aspect 19, wherein the additives are present in an amount of no more than 20% by weight based on total weight of the composition.

Aspect 21. The composition of any of Aspects 1 to 18, wherein the composition is substantially free of additives.

Aspect 22. The composition of any of Aspects 1 to 18, wherein the composition is substantially free of free radical initiators.

Aspect 23. The composition of any of the preceding Aspects, further comprising a second curing agent.

Aspect 24. The composition of Aspect 23, wherein the second curing agent is a latent curing agent, a curing catalyst, or combinations thereof.

Aspect 25. The composition of any of the preceding Aspects, wherein the composition comprises a coating composition, an adhesive composition, or a sealant composition.

Aspect 26. A substrate comprising the coating composition of Aspect 25 in an at least partially cured state.

Aspect 27. The substrate of Aspect 26, wherein at least one of the surfaces of the substrate is 100% water break free.

Aspect 28. The substrate of Aspect 26, wherein at least one of the surfaces of the substrate is non-water break free.

Aspect 29. The substrate of any of Aspects 26 to 28, wherein the substrate comprises a surface of a vehicle body, a component of a vehicle frame, an assembly, or combinations thereof.

Aspect 30. The substrate of Aspect 29, wherein the vehicle comprises an automobile, an aerospace vehicle, or a tank.

Aspect 31. The substrate of any of Aspects 26 to 28, wherein the substrate comprises a protective clothing.

Aspect 32. A part at least partially coated with the composition of any of Aspects 1 to 24.

Aspect 33. An article, comprising:
a first substrate:
a second substrate; and
the composition of any of Aspects 1 to 24 positioned between the first and second substrates.

Aspect 34. The substrate, part or article of any of Aspects 26 to 33, wherein the composition, in the at least partially cured state, has a hardness of greater than 100 N/mm$^2$ and an elongation of at least 40%.

Aspect 35. The substrate, part or article of any of Aspects 26 to 34, wherein the composition, in an at least partially cured state, has a shear stress of at least 33.0 MPa and a shear strain of at least 34.5% measured in accordance with ISO 11003-2.

Aspect 36. The substrate, part or article of any of Aspects 26 to 35, wherein the composition, in an at least partially cured state, has a lap shear strength of greater than 30.0 MPa, measured according to ASTM D1002-10 using 2024-T3 aluminum substrate of 1.6 mm thickness, as measured by an INSTRON 5567 machine in tensile mode with a pull rate of 1.3 mm per minute, and a lap shear displacement at failure of at least 15% of the overlap length.

Aspect 37. A method for forming a coating on a substrate surface comprising:
applying the composition of any of Aspects 1 to 24 to a surface of a first substrate; and
applying an external energy source to at least partially cure the composition.

Aspect 38. The method of Aspect 37, further comprising contacting a surface of a second substrate to the composition such that the composition is located between the first substrate and the second substrate.

Illustrating the invention are the following examples that are not to be considered as limiting the invention to their details. All parts and percentages in the examples, as well as throughout the specification, are by weight unless otherwise indicated.

EXAMPLES

Example 1

Eight compositions were prepared from the mixture of ingredients shown in Table 1. All compositions were prepared at an amine-hydrogen to epoxy equivalence ratio of 1.4:1.0.

TABLE 1

Compositions I-VIII

| Components | I | II | III | IV | V | VI | VII | VIII |
|---|---|---|---|---|---|---|---|---|
| Epon 828[1] | 100.00 | — | 24.40 | — | 23.84 | — | 33.20 | — |
| Epon 863[2] | — | 100.00 | — | 23.72 | — | — | — | 32.80 |
| Kane Ace MX-153[3] | — | — | 73.32 | — | — | — | — | — |
| Kane Ace MX-139[4] | — | — | — | 74.60 | — | — | — | — |
| Fortegra 352[5] | — | — | — | — | 72.80 | — | — | — |
| Kane Ace MX-135[6] | — | — | — | — | — | 100.00 | — | — |
| Kane Ace MX-257[7] | — | — | — | — | — | — | 66.80 | — |
| Kane Ace MX-267[8] | — | — | — | — | — | — | — | 67.20 |
| Dyhard 100S[9] | 16.36 | 17.32 | 12.02 | 13.38 | 12.33 | 13.39 | 12.06 | 13.01 |
| Total | 116.36 | 117.32 | 109.74 | 111.70 | 108.97 | 113.39 | 112.06 | 113.01 |

TABLE 1-continued

| Components | Compositions I-VIII | | | | | | | |
|---|---|---|---|---|---|---|---|---|
| | I | II | III | IV | V | VI | VII | VIII |
| Total weight % core-shell rubber particles | 0% | 0% | 22% | 22% | 22% | 22% | 22% | 22% |

[1] Liquid bisphenol A epoxy resin available from Hexion.
[2] Liquid bisphenol F epoxy resin available from Hexion.
[3] Blend of bisphenol A epoxy resin and ~100 nm diameter core-shell polybutadiene rubber available from Kaneka Corporation
[4] Blend of bisphenol F epoxy resin and ~100 nm diameter core-shell polybutadiene rubber available from Kaneka Corporation
[5] Blend of bisphenol A epoxy resin and ~100 nm diameter core-shell styrene-butadiene rubber available from Olin Epoxy
[6] Blend of bisphenol F epoxy resin and ~100 nm diameter core-shell styrene-butadiene rubber available from Kaneka Corporation
[7] Blend of bisphenol A epoxy resin and ~200 nm diameter core-shell polybutadiene rubber available from Kaneka Corporation
[8] Blend of bisphenol F epoxy resin and ~200 nm diameter core-shell polybutadiene rubber available from Kaneka Corporation
[9] Dicyandiamide available from AlzChem (see size as measured in Example 2).

Compositions I through VIII above were used to prepare thick adherend shear specimens. The thick adherends were 2024-T3 aluminum alloy machined to the dimensions specified for stepped adherends in FIG. 1b of ISO 11003-2. The stepped end of each panel was grit blasted with 54-grit aluminum oxide media (available from Grainger®). The grit blasted area was subsequently cleaned and deoxidized with ChemKleen 490MX (an alkaline cleaning solution available from PPG Industries, Inc., Cleveland, OH). Composition was applied to both adherends covering the 25 mm×5 mm bond area. The adherends were then joined securely in a machined fixture to ensure alignment and uniform bond length of 5 mm and bond thickness of 0.6225 mm. Excess composition was cleaned from gaps and sides of stepped adherends and 1.5 mm thick polytetrafluoroethylene strips were inserted into the gaps to maintain a well-defined bond length. The fixture containing the thick adherend lap joints was then baked at 170° C. for 3.5 hours.

Baked thick adherend lap shear specimens were loaded onto an INSTRON 5567 machine and a D5656 averaging extensometer from Epsilon Technology Corporation with a pin separation distance of 4 mm was placed around the bondline as specified in ISO 11003-2. Specimens were pulled at a rate of 0.5 mm per minute. Table 2 reports the measured values and those calculated based on the equations given in ISO 11003-2, using 28 GPa as the shear modulus of the adherents (MatWeb, LLC), with the strain energy density being the area under the stress-strain curve (FIG. 1).

Lap shear specimens were prepared with compositions I through VIII above according to ASTM D1002-10. The substrate used was 2024-T3 aluminum alloy panels measuring 25.4 mm×101.6 mm×1.6 mm. One end of each panel, including the entire width (25.4 mm) and at least 25.4 mm from one end, was grit blasted with 54-grit aluminum oxide media (available from Grainger®). The grit blasted area was subsequently cleaned and deoxidized with ChemKleen 490MX (an alkaline cleaning solution available from PPG Industries, Inc., Cleveland, OH). Composition was applied to one end of a panel covering the full 25.4 mm width and ≥12.7 mm from one end. Glass beads averaging 0.25 mm in diameter were mixed into the composition in an amount of 2% by weight based on total weight of the composition. A second grit blasted and cleaned aluminum panel was then placed over the composition layer in an end-to-end fashion, resulting in a bond area of 25.4 mm×12.7 mm. Lap joints were secured with metal clips and excess composition cleaned, leaving a 45° fillet. Lap joints were baked at 90° C. for 60 minutes, then the temperature was ramped to 160° C. at 1° C. per minute, and finally held at 160° C. for 90 minutes. The baked lap joint specimens were tested using an INSTRON 5567 machine in tensile mode with 25.4 mm of aluminum substrate in each grip and at a pull rate of 1.3 mm per minute (in accordance with ASTM D1002-10).

TABLE 2

Shear Properties and Lap Joint Performance of Compositions I through VIII.

| | Composition | | | | | | | |
|---|---|---|---|---|---|---|---|---|
| | I | II | III | IV | V | VI | VII | VIII |
| Shear Properties | | | | | | | | |
| d (measured displacement, mm) | 0.06 ± 0.02 | 0.07 ± 0.02 | 0.22 ± 0.03 | 0.24 ± 0.03 | 0.26 ± 0.04 | 0.47 ± 0.04 | 0.21 ± 0.01 | 0.21 ± 0.03 |
| τ (max shear stress, MPa) | 37.2 ± 6.2 | 36.3 ± 2.1 | 33.7 ± 2.2 | 35.0 ± 0.5 | 37.9 ± 0.3 | 40.2 ± 0.4 | 34.5 ± 4.4 | 28.4 ± 3.1 |
| γ (shear strain at failure, %) | 9.0 ± 3.4 | 11.2 ± 3.6 | 35.0 ± 4.9 | 38.3 ± 5.0 | 40.6 ± 7.0 | 74.6 ± 6.6 | 33.3 ± 1.1 | 33.0 ± 4.1 |
| G (shear modulus, MPa) | 808 ± 95 | 781 ± 179 | 466 ± 86 | 419 ± 33 | 679 ± 111 | 747 ± 45 | 635 ± 122 | 587 ± 202 |
| Strain Energy Density (MPa) | 2.3 ± 1.3 | 2.9 ± 1.2 | 10.2 ± 2.3 | 11.6 ± 1.9 | 13.5 ± 2.5 | 26.6 ± 2.3 | 9.6 ± 0.9 | 8.1 ± 1.0 |
| Lap Joint Performance | | | | | | | | |
| Lap Shear Strength (MPa) | 20.3 ± 2.4 | 22.4 ± 1.2 | 32.2 ± 5.7 | 35.6 ± 2.2 | 36.2 ± 1.3 | 42.2 ± 2.3 | 31.8 ± 1.3 | 33.1 ± 3.2 |
| Displacement at Failure (mm) | 1.1 ± 0.2 | 1.2 ± 0.1 | 2.0 ± 0.5 | 2.3 ± 0.2 | 2.3 ± 0.1 | 3.6 ± 0.7 | 2.0 ± 0.1 | 2.1 ± 0.2 |

The data from Example 1 demonstrate that inclusion of styrene butadiene particles having an average particle size of less than 100 nm resulted in an adhesive having improved shear properties (a maximum shear stress of at least 33.01 MPa and a shear strain of at least 34.5%) and/or improved lap shear strength (at least 30.01 MPa) and improved lap shear displacement at failure (at least 15% of the overlap, in this Example, 1.905 mm).

Example 2

Example 2 (compositions IX to XIII) illustrates the effects of guanidine particle size and the effects of elastomeric particle concentration. The particle size of the guanidine were measured in their dry state, prior to mixing into the composition, using a LS 13 320 Laser Diffraction Particle Size Analyzer available from Beckman Coulter. Measurements were performed in triplicate using at least 3 grams of material and under ambient conditions. Dyhard 100 and Dyhard 100S were measured to have D90 particle sizes of 20 μm and 10 μm, respectively. Lap joints were prepared and tested in accordance with ASTM D1002-10, as described above.

TABLE 3

| Compositions IX to XIII | | | | | |
|---|---|---|---|---|---|
| Components | IX | X | XI | XII | XIII |
| Kane Ace MX-135 | 18.18 | 18.18 | 16.00 | 12.81 | 8.82 |
| Epon 863 | — | — | 2.18 | 5.36 | 9.36 |
| Dyhard 100[3] | 1.82 | — | — | — | — |
| Dyhard 100S[3] | — | 1.82 | 1.82 | 1.82 | 1.82 |
| Total | 20.00 | 20.00 | 20.00 | 20.00 | 20.00 |
| Total weight % core-shell rubber particles | 23% | 23% | 20% | 16% | 11% |
| D90 guanidine particle size (μm) | 20 | 10 | 10 | 10 | 10 |
| Lap Joint Performance | | | | | |
| Max Strength (MPa) | 40.6 ± 1.1 | 45.3 ± 2.5 | 41.0 ± 2.2 | 39.8 ± 5.3 | 24.2 ± 1.5 |
| Displacement at failure (mm) | 2.69 ± 0.34 | 5.05 ± 1.24 | 3.23 ± 0.59 | 3.27 ± 1.34 | 1.55 ± 0.10 |

The data from Example 2 illustrate that inclusion of a guanidine having a D90 particle size of less than 25 μm improves both the strength and displacement of the adhesive. The data also demonstrate that inclusion of greater than 11% by weight of elastomeric particles based on total weight of the composition improves strength and displacement of the adhesive.

Example 3

Example 3 illustrates the effect of the addition of mica to the composition. Lap joints were prepared, cured, and tested in accordance with ASTM D1002-10, as described above.

TABLE 4

| Compositions XIV and XV | | |
|---|---|---|
| Components | XIV | XV |
| Kane Ace MX-135 | 22.04 | 22.04 |
| Dyhard 100S | 2.96 | 2.96 |
| Mica[1] | — | 1.31 |
| Total | 25.00 | 26.31 |
| Lap Joint Perormance | | |
| Max Strength (MPa) | 44.0 ± 1.5 | 35.4 ± 0.9 |
| Displacement at failure (mm) | 4.35 ± 0.80 | 2.26 ± 0.05 |

[1]DakotaPURE ™ 3000 available from Pacer Corp.

The data from Example 3 illustrate that the inclusion of mica in the composition reduces both lap shear strength and displacement of the adhesive.

Example 4

Compositions XVI to XXI were prepared as described in Example 1 and as shown in Table 5, but were prepared at an amine-hydrogen to epoxy equivalence ratio of 1.1:1.0. Lap joints were prepared, cured, and tested as described in Example 1.

TABLE 5

| Compositions XVI to XXI | | | | | | |
|---|---|---|---|---|---|---|
| Components | XVI | XVII | XVIII | XIX | XX | XXI |
| Epon 828[1] | 25.00 | — | — | — | — | — |
| Epon 863[2] | — | 25.00 | — | — | — | — |
| Epon 162[3] | — | — | 25.00 | 12.50 | — | — |
| D.E.N. 431 Epoxy Novolac[4] | — | — | — | 12.50 | 25.00 | 12.50 |

TABLE 5-continued

Compositions XVI to XXI

| Components | XVI | XVII | XVIII | XIX | XX | XXI |
|---|---|---|---|---|---|---|
| D.E.N. 439 Epoxy Novolac[5] | — | — | — | — | — | 12.50 |
| Paraloid EXL-2650J[6] | 8.20 | 8.30 | 8.28 | 8.28 | 8.27 | 8.21 |
| Dyhard 100S[7] | 3.13 | 3.46 | 3.38 | 3.37 | 3.36 | 3.15 |
| Aerosil R 202[8] | 1.12 | 1.14 | 1.13 | 1.13 | 1.13 | 1.13 |
| Total | 37.45 | 37.90 | 37.79 | 37.78 | 37.76 | 37.49 |
| Total Weight % Core-Shell | 22% | 22% | 22% | 22% | 22% | 22% |
| Average Epoxide Functionality (Resin) | 2.0 | 2.0 | 2.2 | 2.5 | 2.8 | 3.2 |
| Lap Joint Performance | | | | | | |
| Max Strength (MPa) | 40.6 ± 1.5 | 43.0 ± 1.3 | 42.8 ± 0.4 | 40.2 ± 1.1 | 36.9 ± 3.1 | 25.6 ± 4.0 |
| Displacement at Failure (mm) | 3.45 ± 0.32 | 4.12 ± 0.42 | 3.77 ± 0.19 | 2.96 ± 0.37 | 2.52 ± 0.46 | 1.46 ± 0.25 |

[1]Bisphenol A epoxy resin from Hexion, difunctional epoxy according to supplier technical data sheet (therefore average epoxide functionality assumed to be 2.0).
[2]Bisphenol F epoxy resin from Hexion, difunctional epoxy according to supplier technical data sheet (therefore average epoxide functionality assumed to be 2.0).
[3]Bisphenol F epoxy novolac resin from Dow Chemical, average epoxide functionality = 2.2
[4]Bisphenol F epoxy novolac resin from Dow Chemical, average epoxide functionality = 2.8
[5]Bisphenol F epoxy novolac resin from Dow Chemical, average epoxide functionality = 3.8
[6]Core-shell styrene-butadiene rubber particles available from Dow Chemical
[7]Dicyandiamide available from AlzChem
[8]Hydrophobic fumed silica available from Evonik The data from Example 4 illustrate that lap shear strength and displacement of the adhesive are reduced when the average epoxide functionality of the epoxy-containing component is greater than 3.2.

Example 5

Two compositions were prepared from the mixture of ingredients shown in Table 6. All compositions were prepared at equal weight % dicyandiamide based on total composition weight. Lap joints were prepared, cured, and tested as described in Example 1.

TABLE 6

Compositions XXII and XXIII

| Components | XXII | XXIII |
|---|---|---|
| Kane Ace MX-135 | 25.00 | 25.00 |
| Epon 863 | 1.82 | — |
| Flexibilizer DY965[1] | 5.47 | 7.29 |
| Dyhard 100S | 3.43 | 3.43 |
| Total | 35.72 | 35.72 |
| Weight % Core-Shell Rubber | 18% | 18% |
| Weight % DY965 | 15% | 20% |
| Lap Joint Performance | | |
| Max Strength (MPa) | 39.2 ± 0.8 | 33.4 ± 1.5 |
| Displacement at Failure (mm) | 2.65 ± 0.12 | 2.09 ± 0.08 |

[1]Phenol-capped urethane flexibilizer available from Huntsman

The data from Example 6 illustrate that inclusion of a flexibilizer in the composition does not improve lap shear strength and displacement of the adhesive (c.f., strength and displacement of Composition XII, above).

Example 6

Lap joint specimens were prepared with Scotch-Weld™ Epoxy Adhesive EC-1386 and with composition XIV (Example 3, above) under the optimum conditions specified in the technical data sheet for EC-1386, as follows. All 2024-T3 aluminum substrate (1.6 mm thick) was prepared using an alkaline degrease and an acid etch. Lap joint specimens were prepared according to ASTM D1002-10. In order to maintain a bondline thickness within the specified optimal performance range for EC-1386 (2 to 5 mil), 3 mil glass beads were added to each composition at 2% by weight based on total weight of the composition. Lap joint specimens were baked at 177° C. for 90 minutes, the recommended cure cycle to obtain optimum bond properties of EC-1386. Testing was conducted according to ASTM D1002-10.

TABLE 7

Lap Joint Performance

| Composition | Scotch-Weld™ EC-1386[1] | XIV |
|---|---|---|
| Max Strength (MPa) | 27.6 ± 0.6 | 47.7 ± 0.5 |
| Displacement at failure (mm) | 1.88 ± 0.11 | 6.58 ± 0.10 |

[1]Commercial one-component epoxy composition available from 3M and containing 10-20 wt % elastomeric phase and 5-10 wt % dicyandiamide; average diameter of elastomeric phase in cured composition measured to be 508 ± 50 nm from TEM of microtome cross-sections.

The data from Example 6 illustrate the importance of including in the adhesive composition at least 50% of elastomeric particles having an average particle size of less than 150 nm as measured by TEM.

Example 7

Compositions I to VII were used to prepare thermosetting coatings on steel and aluminum. Coatings were prepared using a 0.10 mm draw down bar on acetone-cleaned metal substrate and were baked at 90° C. for 60 minutes, followed by a ramp to 160° C. at 1° C. per minute, and finally held at 160° C. for 90 minutes. Coatings prepared on cold rolled steel (0.81 mm thick) were tested for hardness using a Fischerscope HM2000S at a rate of 100 mN/10 s. Coatings prepared on T0-2024 aluminum (0.81 mm thick) were used for reverse impact elongation testing according to ASTM D6905 with a Gardco GE Universal Impact Tester IM-172-GE/1. Results are compiled in Table 8 and are an average of at least three measurements.

TABLE 8

Coating Hardness and Impact Elongation of Compositions I to VII

| | Composition | | | | | | |
|---|---|---|---|---|---|---|---|
| | I | II | III | IV | V | VI | VII |
| Hardness (N/mm²) | 177 ± 3 | 222 ± 3 | 104 ± 2 | 131 ± 18 | 101 ± 1 | 122 ± 1 | 85 ± 2 |
| Impact Elongation (%)[1] | 13 ± 4 | 10 ± 0 | 48 ± 10 | >60 | 48 ± 10 | >60 | 26 ± 12 |

The data from Example 7 demonstrate that inclusion of styrene butadiene particles having a particle size of less than 100 nm resulted in a coating having a hardness of greater than 100 N/mm² and a reverse impact elongation of at least 40%.

We claim:

1. A composition comprising:
    an epoxy-containing component in an amount of at least 45% to no more than 85% by weight based on total weight of the composition and comprising a bisphenol F epoxy resin;
    elastomeric core-shell particles in an amount of greater than 11% by weight to 25% by weight based on total weight of the composition, wherein the core-shell elastomeric particles have an average particle size of 50 nm to 150 nm as measured by electron transmission microscopy; and
    a curing component activatable by an external energy source, the curing component comprising at least one guanidine in an amount of 2% to 20% by weight based on total weight of the composition and comprising a D90 particle size of 25 μm measured by dynamic light scattering.

2. The composition of claim 1, wherein the epoxy-containing component comprises an epoxy equivalent weight of 160 g/eq to 500 g/eq.

3. The composition of claim 1, wherein the epoxy-containing component has an average epoxide functionality of greater than 1.0 and less than 3.2.

4. The composition of claim 1, wherein the epoxy-containing component has an average epoxide functionality of greater than 1.0 and no more than 2.8.

5. The composition of claim 1, wherein at least one guanidine comprises dicyandiamide.

6. The composition of claim 1, further comprising filler in an amount of no more than 20% by weight based on total weight of the composition and/or additives in an amount of no more than 20% by weight based on total weight of the composition.

7. The composition of claim 1, wherein the composition is substantially free of additives, platy fillers, and/or free radical initiators.

8. The composition of claim 1, wherein the composition is a coating composition, an adhesive composition, or a sealant composition.

9. The composition of claim 1,
    wherein no more than 50% by weight of the elastomeric core-shell particles comprise a polybutadiene core based on total weight of the elastomeric core-shell particles.

10. The composition of claim 1, wherein no more than 50% by weight of the elastomeric core-shell particles comprise a polysiloxane core based on total weight of elastomeric core-shell particles.

11. The composition according to claim 1,
    wherein at least 50% by weight of the elastomeric core-shell particles comprise a styrene butadiene core based on total weight of the elastomeric core-shell particles.

12. The composition of claim 1, wherein the composition is substantially free of platy filler.

13. The composition of claim 1, wherein the composition is substantially free of platy filler and at least 50% by weight of the elastomeric core-shell particles comprise a styrene butadiene core based on total weight of the elastomeric core-shell particles.

* * * * *